No. 792,821.

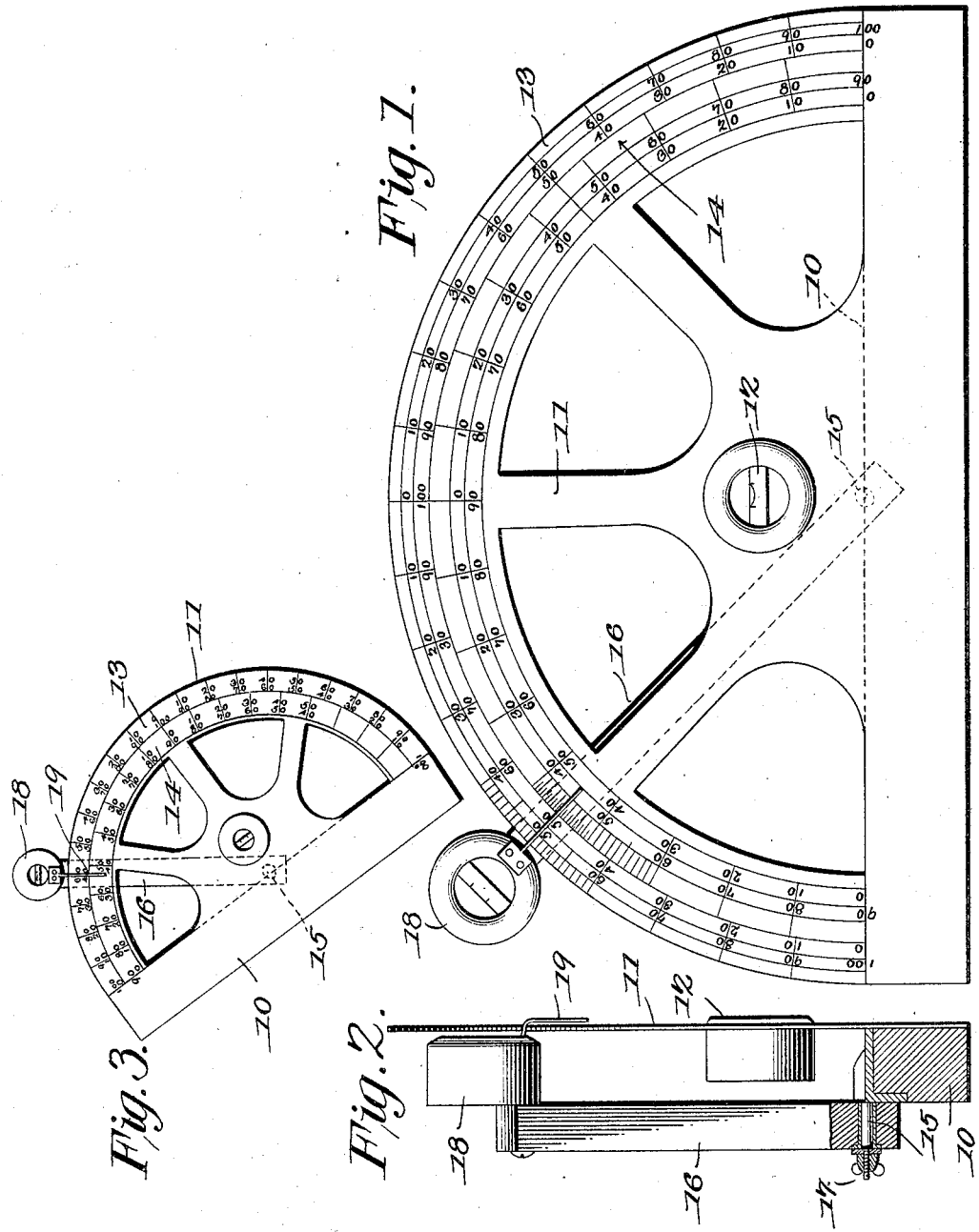

Patented June 20, 1905.

UNITED STATES PATENT OFFICE.

MANUEL GOLIGHTLY, OF METROPOLIS, ILLINOIS.

COMBINED LEVELING AND PITCH INDICATOR.

SPECIFICATION forming part of Letters Patent No. 792,821, dated June 20, 1905.

Application filed September 30, 1904. Serial No. 226,683.

*To all whom it may concern:*

Be it known that I, MANUEL GOLIGHTLY, a citizen of the United States, residing at Metropolis, in the county of Massac and State of Illinois, have invented a new and useful Combined Leveling and Pitch Indicator, of which the following is a specification.

This invention relates to devices for determining or measuring angles from horizontal or vertical planes, for leveling or plumbing objects, or for determining and denoting the percentage of "pitch" or inclination of the same.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a front elevation of the improved device. Fig. 2 is a side elevation, partly in section, of Fig. 1. Fig. 3 is a view similar to Fig. 1, on a reduced scale, illustrating one means of using the device.

The improved device comprises a base member 10, preferably of wood and supporting a plate 11, preferably half-circular in shape and attached to one side of the base member. The base member is dressed true and square and resembles the ordinary spirit-level or straight-edge employed by carpenters and other mechanics, and the plate 11 is provided with a spirit-bulb 12 to enable the implement to be thus employed, as will be obvious. The plate 11 is preferably semicircular in shape and provided with two sets of graduations, as indicated, respectively, at 13 14, one set of graduations being divided into tenths and parts of tenths of a quadrant and the other set into degrees and parts of degrees of a quadrant. The graduations will preferably be disposed concentrically and close together, as shown, and numbered to read in opposite directions from the center of the plate.

Projecting rearwardly of the base member 10 is a stud 15 in transverse alinement with the center of the plate 11, and mounted to swing upon this stud is an arm 16, said arm being clamped in position by a thumb-nut 17. The arm 16 extends wholly beyond the base member, so that it can rest upon a body disposed at an angle to the body upon which the base member rests, as will be obvious.

Attached to the arm 16 is a spirit-bulb 18, with the spirit-tube preferably disposed transversely of the arm, and also attached to the arm is a pointer 19, the pointer being long enough to extend over both of the sets of graduations 13 14, as shown.

The device may be of any desired size and of any required material and when thus constructed may be employed for all the purposes for which the ordinary carpenter's level is used and in addition may be employed for accurately determining the pitch of the various rafters and other angular members in roofs and similar structures to determine both the degree of angularity and the percentage of inclination or "grade" of structures of various kinds, such as railroads and other roads, walks, trestle-works, and the like.

To illustrate the operation, suppose it is desired to ascertain the exact position of one inclined member or object relative to another. If one of the objects is horizontal or level, the bulb 12 will indicate that fact when the base 10 is placed thereon. The base 10 is then adjusted upon the horizontal structure with the arm 16 resting upon the inclined structure, when the pointer 19 will indicate the pitch in decimals upon the graduations 13 and the degree of angularity upon the graduations 14. If one structure is vertical, the arm 16 is placed against the vertical and the base 10 upon the inclined structure, the pointer 19 indicating the pitch and degree, as before. If neither structure is plumb or level, then the difference in the pitch and degree of inclination between them can be easily calculated by "reading" the graduations, as will be understood.

By the use of this implement all the annoying and tedious calculations for determining the pitch or inclination in roofs and similar structures is dispensed with, as the same can be instantly ascertained, as above described.

Another way of using the implement where a portion of the structure is inclined and it is desired to ascertain the degree of inclination and pitch of the same is to place the base 10 on the inclined portion and adjust the arm 16 until its bulb 18 is level, when the pointer 19 will indicate the pitch by the graduations 13 and the degree of angularity by the graduations 14, reading from the center of the plate.

Having thus described the invention, what is claimed is—

In a device of the class described, a straight-edge, a quadrant secured to the straight-edge and provided with graduations indicating, respectively, tenths and tenths of parts of said quadrant and degrees and parts of degrees of the latter, a spirit-bulb carried by the quadrant, a pin extending laterally from the straight-edge and provided with terminal threads, an arm mounted for lateral swinging movement on said pin and having its free end spaced from the rear of the quadrant, a spirit-bulb secured to the free end of said arm, a pointer carried by the arm and extending over both sets of graduations, and a nut engaging the terminal threads of the pin for clamping the swinging arm in adjusted position.

In testimony that I claim the foregoing as my own I have hereto affixed my signature in the presence of two witnesses.

MANUEL GOLIGHTLY.

Witnesses:
J. H. MIZELL,
ETHEL DUGGER.